US007994966B1

(12) United States Patent
Olsson et al.

(10) Patent No.: US 7,994,966 B1
(45) Date of Patent: Aug. 9, 2011

(54) DEVICE FOR GENERATION OF MICROWAVES

(75) Inventors: Fredrik Olsson, Orebro (SE); Magnus Karlsson, Karlskoga (SE)

(73) Assignee: BAE Systems Bofors AB, Karlskoga (SE)

( * ) Notice: Subject to any disclaimer, the term of this patent is extended or adjusted under 35 U.S.C. 154(b) by 546 days.

(21) Appl. No.: 10/584,560

(22) Filed: May 31, 2007

(30) Foreign Application Priority Data

Jun. 1, 2006 (SE) .................................... 0601209-0

(51) Int. Cl.
*G01S 7/282* (2006.01)

(52) U.S. Cl. ......... 342/175; 342/200; 342/202; 342/204

(58) Field of Classification Search .................. 342/175, 342/200–204
See application file for complete search history.

(56) References Cited

U.S. PATENT DOCUMENTS 4,751,429 A 6/1988 Minich
5,164,634 A * 11/1992 Convert et al. .................... 315/5
5,235,248 A * 8/1993 Clark et al. ........................ 315/5
5,563,555 A * 10/1996 Nalos et al. ...................... 331/81
7,164,234 B2 * 1/2007 Achenbach et al. ........ 315/39.51
2006/0208672 A1 * 9/2006 Achenbach et al. .......... 315/500

FOREIGN PATENT DOCUMENTS

GB 2462874 A * 3/2010
WO WO 2009136832 A1 * 11/2009

OTHER PUBLICATIONS

Shao et al. "Numerical Simulation Studies of Coaxial Vircators." Northwest Institute of Nuclear Technology, pp. 792-795.
Chen et al. "Microwave Frequency Determination Mechanisms in a Coaxial Vircator." IEEE Transactions on Plasma Science, vol. 32, No. 5, Part 1, Oct. 2004, pp. 1799-1804.
Jiang et al. "Efficiency Enhancement of Ceoaxial Virtual Cathode Oscillator." IEEE Transactions on Plasma Science, Oct. 1999, vol. 27, No. 5, pp. 1543-1544.
Jiang et al. "High Power Microwave Generation by a Coaxial Vircator." Pulsed Power Conference, Digest of Technical Papers, 12th IEEE International Monterey, CA, USA, vol. 1, Jun. 27-30, 1999, pp. 194-197.
Hao et al. "Characteristics of Coaxial Vircator in Three Specific Configuration." Plasma Science and Technology, vol. 5, No. 5, Oct. 2003, pp. 2001-2005.

* cited by examiner

*Primary Examiner* — John B Sotomayor
(74) *Attorney, Agent, or Firm* — Jacobson Holman PLLC

(57) ABSTRACT

The invention relates to a device for generation of microwaves comprising a virtual cathode oscillator (1) in a coaxial embodiment with an outer cylindrical tube forming a cathode (2) and connected to a transmission line (14) for feeding the cathode (2) with voltage pulses, and an inner cylindrical tube, at least partially transparent for electrons, forming a anode (3) and connected to a waveguide (13) for outputting microwave radiation generated by the formation of a virtual cathode (4) inside an area enclosed by the anode. Through the introduction of electrically conductive structures (5 and 6) a device for generation of microwaves is achieved that demonstrates higher efficiency and higher peak output.

14 Claims, 2 Drawing Sheets

DEVICE FOR GENERATION OF MICROWAVES

Figure 1:
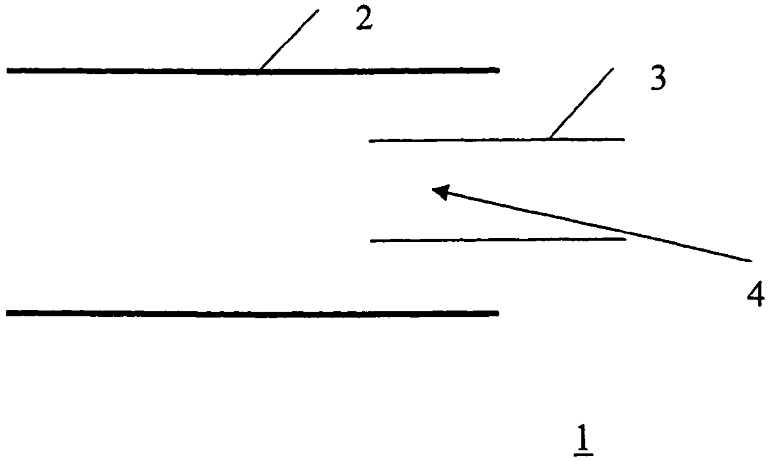
Fig. 1 Prior Art

The present invention relates to a device for generation of microwaves comprising a coaxial virtual cathode oscillator (vircator) with an outer cylindrical tube forming a cathode and connected to a transmission line for feeding the cathode with voltage pulses, and an inner cylindrical tube, at least partially transparent for electrons, forming an anode and connected to a waveguide for outputting microwave radiation generated by the formation of a virtual cathode inside an area enclosed by the anode.

Microwave generators of this type can, among other uses, be used to knock out electronics using the high peak output that can briefly be generated.

A device as described in the first paragraph is essentially previously known from U.S. Pat. No. 4,751,429 and the article "Numerical Simulation Studies of Coaxial Vircators", by Hao Shao, Guozhi Liu, Zhimin Song, Yajun Fan, Xiaoxin Song, Northwest Institute of Nuclear Technology, P 792-795.

One general problem with virtual cathode oscillators is that they have low efficiency. It is therefore desirable to be able to increase the device's efficiency. Additionally, it can be advantageous to be able to increase the device's peak output.

One purpose of the present invention is to make a device for generation of microwaves with improved efficiency. Another purpose is to improve the device's peak output. Because the virtual cathode oscillator, the vircator, is primarily used to create microwave radiation with high output, peak output efficiency is a very important parameter.

The purpose of the invention is achieved through a device for generation of microwaves in accordance with the first paragraph wherein the cylindrical tube of the cathode on the inside is equipped with a first electrically conductive structure transverse to the tube's longitudinal direction at a distance from the anode's, for the electron's at least partially transparent, tube and that the anode's, for the electron's at least partially transparent, tube on the outside is equipped with a second electrically conductive structure transverse to the tube's longitudinal direction at a distance from the cathode's cylindrical tube for creating resonant cavities in the virtual cathode oscillator. Through the introduction of a first and second electrically conductive structure in the specified manner a reactive cavity is created with resonant phenomena in the radiation source resulting in an increased efficiency and increased peak output efficiency.

According to a first favourable embodiment of the device, distance $d_1$ between the first electrically conductive structure arranged in the cathode's cylindrical tube and the anode's at least partially transparent tube is essentially determined by the generated microwave wavelength $\lambda$ in accordance with the formula:

$$d_1=\lambda*n/4, \text{ where } n=1, 3, 5, \ldots$$

and in particular distance $d_1$ can be essentially $\lambda/4$.

According to a second favourable embodiment of the device, distance $d_2$ between the second electrically conductive structure arranged on the outside of the anode's, at least partially transparent, tube and the cathode's cylindrical tube is essentially determined by the generated microwave wavelength $\lambda$ in accordance with the formula:

$$d_2=\lambda*n/4, \text{ where } n=1, 3, 5, \ldots$$

and in particular distance $d_2$ can be essentially $\lambda/4$.

By determining the distance in accordance with the first and the second favourable, proposed embodiments, the efficiency for the virtual cathode oscillator in the coaxial design is a pronounced improvement. The distances cause a positive feed back or reaction on the oscillation process that is amplified and thereby an increased efficiency is attained.

According to another proposed favourable embodiment, the device comprises an adjustment mechanism for adjusting distances $d_1$ and $d_2$. The adjustment mechanism can thereby consist of a screw joint for axial offset of the first electrically conductive structure through rotation. Furthermore, the adjustment mechanism can comprise a screw joint for axial offset of the second electrically conductive structure through rotation. By means of these adjustment possibilities the device can be adjusted optimally based on experimental results, computations, simulations, or other parameters.

The first and second electrically conductive structures can preferably be implemented from a metal, for example aluminium.

A high voltage generator connected to the cathode's transmission line is suitable for feeding the device cathode. Additionally, the wave guide for output of the microwave radiation is connected to an antenna. The antenna can be, for example, a horn antenna. In a proposed embodiment the device anode is composed, at least partially, of mesh. As an alternative, the anode can partially be composed of a thin foil.

The present invention will be described in more detail below with reference to appended drawings, in which:

FIG. 1 schematically depicts an example of a known coaxial virtual cathode oscillator comprised in a the device for generation of microwaves.

Figure 2:
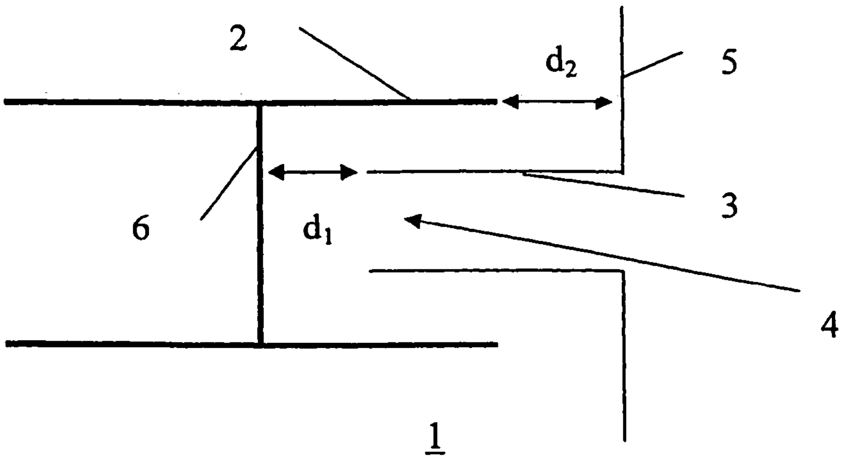

FIG. 2 schematically depicts an example of a coaxial virtual cathode oscillator in accordance with the present invention comprised in a device for generation of microwaves.

Figure 3:
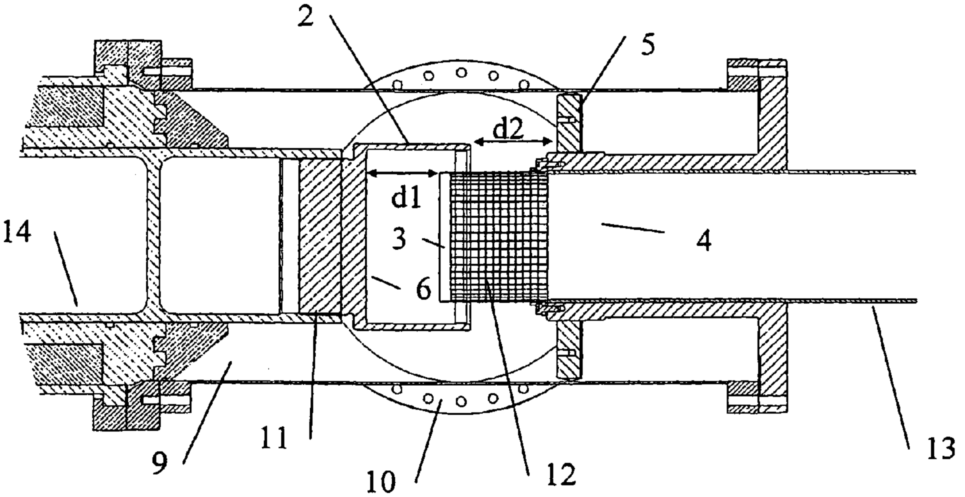

FIG. 3 schematically depicts a more detailed example of a coaxial virtual cathode oscillator in accordance with the present invention comprised in a device for generation of microwaves.

Figure 4:
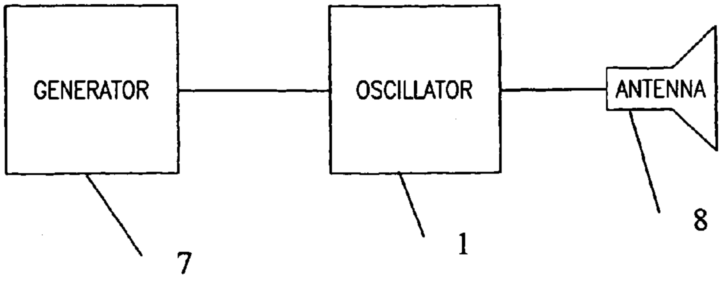

FIG. 4 schematically in block form depicts a complete device for generation of microwaves comprising a coaxial virtual cathode oscillator in accordance with the present invention.

The known coaxial virtual cathode oscillator 1, schematically depicted in FIG. 1, contains a cathode 2 in the form an outer cylindrical tube and an anode 3 in the form of an inner cylindrical tube. The cathode oscillator is a very simple geometric design and is based on a so-called virtual cathode 4 occurring inside of the anode under certain conditions. As is depicted in the figure, there are no limiting walls in the axial direction in connection with the cathode and anode.

FIG. 2 depicts on the schematic level a modification of the known coaxial virtual cathode oscillator for improving efficiency and increasing peak output. In accordance with this design two electrically conductive structures 5 and 6 are introduced. The structure 5 is arranged on the outside of the anode's cylindrical tube and transverse to the tube's longitudinal direction. The structure 6 is arranged on the inside of the cathode's cylindrical tube and transverse to the tube's longitudinal direction. The distance between the cathode's end and the structure 5 is depicted as $d_2$ and the distance between the anode's end against the cathode and structure 6 is depicted as $d_1$. Distances $d_1$ and $d_2$ are determined from the generated wavelength in accordance with the formula:

$$d_1=d_2=\lambda*n/4, \text{ where } n=1, 3, 5, \ldots$$

The coaxial virtual cathode oscillator 1 can be a component of the device for generation of microwaves depicted in FIG. 4 and including a high voltage generator 7 connected to the cathode oscillator input and an antenna 8 connected to the cathode oscillator output. The antenna can be a horn antenna.

The cathode oscillator with peripherals is depicted and described in more detail in reference to FIG. 3, both regarding design and function. Reference designations that correspond to previously described figures have been given the same reference designations in FIG. 3. As depicted in FIG. 3, the anode 3 and the cathode 2 are arranged in a vacuum chamber 9 with a connection 10 for a vacuum pump (not depicted in the figure). A screw joint 11 enables the adjustment of the structure's 6 distance $d_1$ to the anode 3 through rotation. A corresponding screw joint can be arranged for adjustment of the structure's 5 distance $d_2$ to the cathode 2. The anode 3 is equipped with a mesh 12 that partially is transparent to free, electrically charged particles. The anode 3 passes to an outgoing waveguide 13, while the cathode 2 is feed by a transmission line 14.

The cathode oscillator's design is based on the fact that a so-called virtual cathode occurs under certain conditions. When a voltage pulse with negative potential is fed via the transmission line 14 to the cathode 2, a high electric field occurs between the cathode 2 and the anode 3. This causes electrons to be field emitted from the cathode material. The electrons accelerate after that toward the anode structure and the majority of the electrons will even pass the anode and begin to decelerate. If certain conditions are met, a virtual cathode 4 will occur inside the anode structure. Because the process is strongly non-linear, the phenomena that cause the microwave radiation to be generated occur. The more detailed conditions for microwave generation are not described here because they are part of the competence for expert in the field. Under the correct conditions, very high output is generated for a short period with a typical magnitude of 50-100 ns prior to shortcircuiting. Generated microwaves leave the cathode oscillator anode via the waveguide 13 connected to the anode and that waveguide has essentially the same radius as the anode 3. The electrically conductive structures 5 and 6 contribute to the creation of a resonant phenomenon that results in increased efficiency and peak output.

The present invention is not limited to the embodiment examples described above, but can be subject to modification within the framework of the subsequent patent claims.

The invention claimed is:

1. Device for generation of microwaves comprising a coaxial virtual cathode oscillator with an outer cylindrical tube forming a cathode and connected to a transmission line for supplying the cathode with voltage pulses, and a inner cylindrical tube, at least partially transparent for electrons, forming an anode and connected to a waveguide for outputting microwave radiation generated by the formation of a virtual cathode inside an area enclosed by the anode, wherein the cylindrical tube of the cathode on the inside is equipped with a first electrically conductive structure transverse to the tube's longitudinal direction at a distance from the anode's, for the electron's at least partially transparent, tube and that the anode's, for the electron's at least partially transparent, tube on the outside is equipped with a second electrically conductive structure transverse to the tube's longitudinal direction at a distance from the cathode's cylindrical tube for creating resonant cavities in the virtual cathode oscillator.

2. Device as claimed in claim 1, wherein distance $d_1$ between the first electrically conductive structure arranged in the cathode's cylindrical tube and the anode's at least partially transparent tube is essentially determined by the generated microwave wavelength l in accordance with the formula:

$$d_1 = l*n/4, \text{ where } n=1, 3, 5, \ldots$$

3. Device as claimed in claim 2, wherein distance $d_1$ is essentially l/4.

4. Device as claimed in claim 1, wherein distance $d_2$ between the second electrically conductive structure arranged on the outside of the anode's, at least partially transparent, outer cylindrical tube and the cathode's cylindrical tube is essentially determined by the generated microwave wavelength l in accordance with the formula:

$$d_2 = l*n/4, \text{ where } n=1, 3, 5, \ldots$$

5. Device as claimed in claim 4, wherein distance $d_2$ is essentially l/4.

6. Device as claimed in claim 4, wherein the device comprises an adjustment mechanism for adjusting the distances $d_1$ and $d_2$.

7. Device as claimed in claim 6, wherein the adjustment mechanism can comprises a screw joint for axial offset of the first electrically conductive structure through rotation.

8. Device as claimed in claim 7, wherein the adjustment mechanism comprises of a screw joint for axial offset of the second electrically conductive structure through rotation.

9. Device as claimed in claim 1, wherein the first and second electrically conductive structure essentially consists of aluminium.

10. Device as claimed in claim 1, wherein the transmission line for feeding the cathode is connected to a high voltage generator.

11. Device as claimed in claim 1, wherein the waveguide for outputting microwave radiation is connected to an antenna.

12. Device as claimed in claim 10, wherein the antenna is a horn antenna.

13. Device as claimed in claim 1, wherein the anode is composed, at least partially, of mesh.

14. Device as claimed in claim 1, wherein the anode is composed, at least partially, of a thin foil.

* * * * *